United States Patent
Xuan et al.

(10) Patent No.: US 10,366,243 B2
(45) Date of Patent: Jul. 30, 2019

(54) PREVENTING RESTRICTED CONTENT FROM BEING PRESENTED TO UNAUTHORIZED INDIVIDUALS

(71) Applicant: AirWatch LLC, Atlanta, GA (US)

(72) Inventors: Chaoting Xuan, Duluth, GA (US); Chen Lu, Sandy Springs, GA (US)

(73) Assignee: AirWatch, LLC, Atlanta, GA (US)

( * ) Notice: Subject to any disclaimer, the term of this patent is extended or adjusted under 35 U.S.C. 154(b) by 132 days.

(21) Appl. No.: 15/015,286

(22) Filed: Feb. 4, 2016

(65) Prior Publication Data

US 2017/0228549 A1 Aug. 10, 2017

(51) Int. Cl.
| | | |
|---|---|---|
| G06F 21/62 | (2013.01) | |
| H04L 29/06 | (2006.01) | |
| G06F 21/31 | (2013.01) | |
| G06F 21/84 | (2013.01) | |

(52) U.S. Cl.
CPC .............. *G06F 21/62* (2013.01); *G06F 21/31* (2013.01); *G06F 21/84* (2013.01); *H04L 63/06* (2013.01)

(58) Field of Classification Search
None
See application file for complete search history.

(56) References Cited

U.S. PATENT DOCUMENTS

| | | | | |
|---|---|---|---|---|
| 7,188,317 B1* | 3/2007 | Hazel | .................... | G06F 3/0481 715/804 |
| 9,389,745 B1* | 7/2016 | Leatham | ................. | G06F 3/048 |
| 2009/0167774 A1* | 7/2009 | Want | ..................... | G06F 3/1431 345/543 |
| 2010/0053069 A1* | 3/2010 | Tricoukes | ............. | G06F 3/1431 345/156 |
| 2013/0247144 A1* | 9/2013 | Marshall | ............... | G06F 21/335 726/1 |
| 2013/0254889 A1* | 9/2013 | Stuntebeck | ........... | G06F 21/562 726/23 |
| 2013/0311660 A1* | 11/2013 | Dabbiere | ................ | H04L 29/08 709/225 |
| 2014/0108792 A1* | 4/2014 | Borzycki | ............ | G06F 21/6218 713/165 |
| 2014/0191926 A1* | 7/2014 | Mathew | ................ | G06F 3/0481 345/1.1 |
| 2014/0195927 A1* | 7/2014 | DeWeese | ................ | H04L 63/10 715/750 |

(Continued)

*Primary Examiner* — Farid Homayounmehr
*Assistant Examiner* — Olanrewaju J. Bucknor
(74) *Attorney, Agent, or Firm* — Clayton, McKay & Bailey, PC

(57) ABSTRACT

A system includes a computing device and a storage device storing computer instructions that are executable by the computing device. The computer instructions cause the computing device to detect a request to render content in a first display of a primary user device. The computer instructions further cause the computing device to determine whether the primary user device satisfies a compliance rule indicating whether the first display of the primary user device is authorized to render the content. In response to determining that the primary user device fails to satisfy the compliance rule, the computer instructions cause the computing device to prevent the content from being rendered in the first display of the primary user device and cause the content to be rendered in a second display of a secondary user device.

20 Claims, 8 Drawing Sheets

(56) References Cited

U.S. PATENT DOCUMENTS

| | | | |
|---|---|---|---|
| 2014/0253412 A1* | 9/2014 | Blaich | G06F 3/1454 345/1.2 |
| 2014/0280934 A1* | 9/2014 | Reagan | H04L 47/70 709/225 |
| 2014/0282846 A1* | 9/2014 | DeWeese | H04L 63/0428 726/1 |
| 2014/0297756 A1* | 10/2014 | Qureshi | H04L 41/0816 709/205 |
| 2014/0337925 A1* | 11/2014 | Marshall | H04L 63/10 726/4 |
| 2015/0205106 A1* | 7/2015 | Norden | G02B 27/01 345/7 |
| 2016/0189335 A1* | 6/2016 | Roy | G06F 3/1423 345/545 |
| 2016/0266747 A1* | 9/2016 | Leatham | G06F 3/048 |
| 2017/0374061 A1* | 12/2017 | Jayanti Venkata | G06F 8/60 |

* cited by examiner

PREVENTING RESTRICTED CONTENT FROM BEING PRESENTED TO UNAUTHORIZED INDIVIDUALS

BACKGROUND

Individuals often use computing devices to render confidential content, such as financial information, on a display. For example, while traveling in an airplane, an individual can use a laptop computer to view confidential accounting records for a business. However, other individuals that are in the field of view of the display of the laptop computer can potentially view the confidential content as well. For example, other passengers seated next to or behind the individual operating the laptop computer can view the confidential information being presented in the display. The act of an individual intercepting confidential information in this way can be referred to as "shoulder surfing" or "visual hacking."

In an attempt to prevent shoulder surfing, an individual can mount a polarized privacy screen over the display of the laptop computer. The polarized privacy screen can cause the display to appear black when someone is not directly in front of the display, thereby preventing individuals who are not directly in front of the display from viewing content on the display. However, someone peering over the shoulder of the individual operating the laptop computer may still be able to view the content despite the polarized privacy screen being installed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to preventing unauthorized individuals from being able to view restricted content. In one example, a user can have access to a laptop computer and an optical head-mounted or wearable display device. When the user attempts to access restricted content, such as confidential accounting data in a spreadsheet, a management component in the laptop computer can determine whether the laptop computer is located in a secured area, such as the premises of an organization that is associated with the spreadsheet. If the laptop computer is located outside of the secured area, the management component can prevent the restricted content from being rendered in the display of the laptop. In addition, the management component can cause at least a portion of the restricted content to be rendered in the optical head-mounted display device. In this way, only the user wearing the optical head-mounted display device can view the restricted content.

In the following discussion, examples of systems and their components are described, followed by examples of the operation of those systems.

Figure 1:
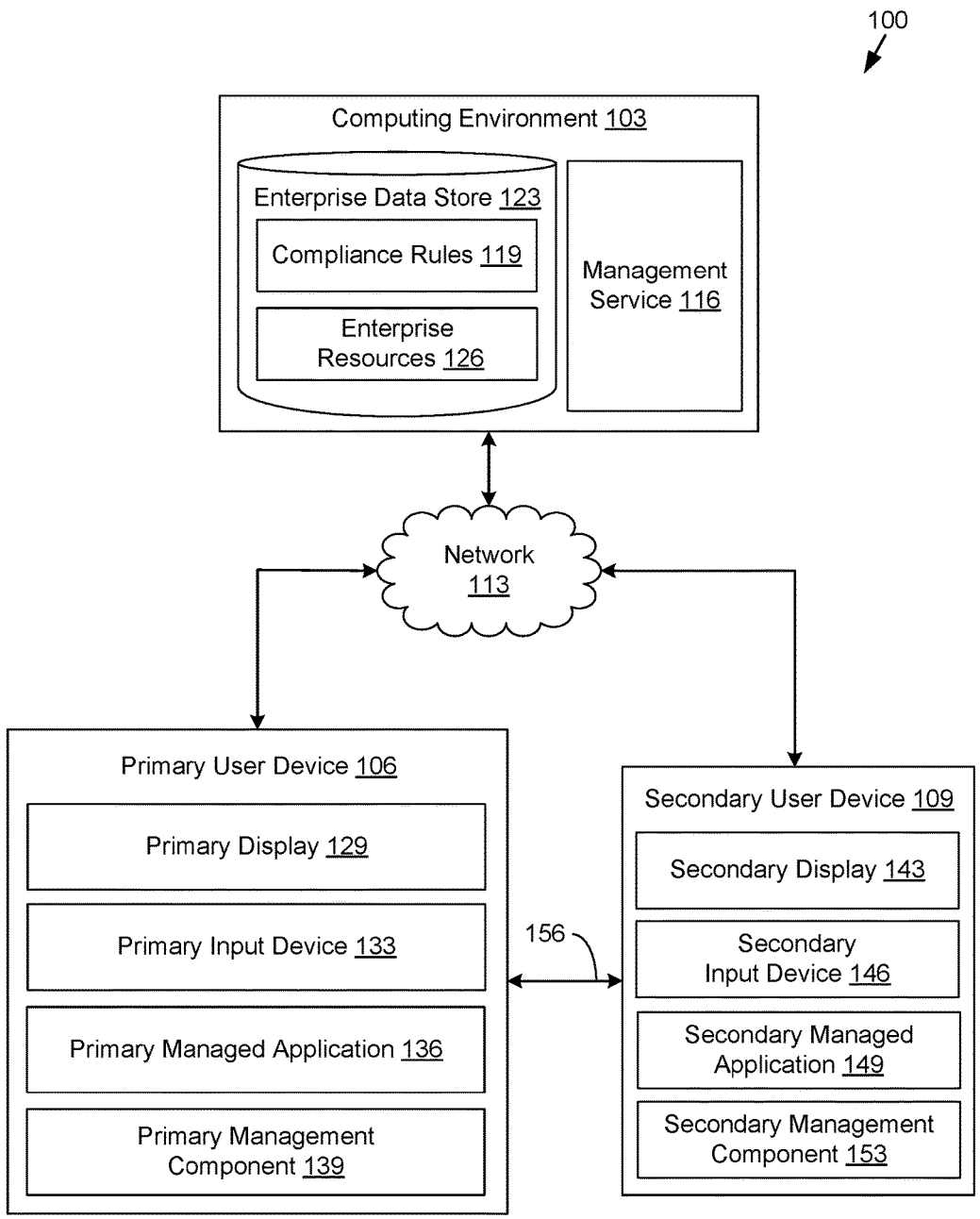
FIG. 1 is a drawing of an example of a networked environment.

With reference to FIG. 1, shown is an example of a networked environment 100. The networked environment 100 can include a computing environment 103 a primary user device 106, and a secondary user device 109 in data communication through a network 113. The network 113 can include the Internet, one or more intranets, extranets, wide area networks (WANs), local area networks (LANs), wired networks, wireless networks, or any combination of two or more such networks. The network 113 can include satellite networks, cable networks, Ethernet networks, cellular networks, and telephony networks.

The computing environment 103 can be a computing system operated by one or more enterprises, such as a business or other organization. The computing environment 103 can include a computing device, such as a server computer, that can provide computing capabilities. Alternatively, the computing environment 103 can include multiple computing devices arranged in one or more server banks or computer banks. For examples in which the computing environment 103 includes multiple computing devices, the computing devices can be located in a single installation, or the computing devices can be distributed among multiple different geographical locations.

In some examples, the computing environment 103 can include computing devices that together form a hosted computing resource or a grid computing resource. In other examples, the computing environment 103 can operate as an elastic computing resource for which the allotted capacity of computing-related resources, such as processing resources, network resources, and storage resources, can vary over time. In other examples, the computing environment 103 can include or be operated as one or more virtualized computer instances that can be executed in order to perform the functionality that is described herein.

The computing environment 103 can include various systems. For example, the computing environment 103 can include a management service 116 that can monitor and manage the operation of client devices, such as the primary user device 106 and the secondary user device 109, associated with the enterprise that operates the computing environment 103. In some examples, the management service 116 can manage and oversee the operation of multiple client devices, such as the primary user device 106 and the secondary user device 109, enrolled in a mobile device management service that is provided by the management service 116. The management service 116 can also provide the client devices, such as the primary user device 106 and the secondary user device 109, with access to email, calendar data, contact information, and other resources associated with the enterprise.

The management service 116 can assign various compliance rules 119 to respective client devices, such as the primary user device 106 and the secondary user device 109. The compliance rules 119 can specify, for example, one or more conditions that must be satisfied for the primary user device 106 or the secondary user device 109 to be deemed compliant with the compliance rule 119. In various examples, the computing environment 103, the primary user device 106, the secondary user device 109, or any combination thereof can determine whether the primary user device 106 and the secondary user device 109 satisfies a compliance rule 119. For example, the primary user device 106 can generate a data object that describes the state of the primary user device 106 along with associated information, settings, and parameters. Components in the primary user device 106 or the management service 116 can evaluate the data object to determine whether the primary user device 106 is compliant with corresponding compliance rules 119. The secondary user device 109 can also generate a data object that is evaluated in a similar manner.

In one example, a compliance rule 119 can specify that particular applications are prohibited from being installed in the primary user device 106 or the secondary user device 109. As another example, a compliance rule 119 can specify that the primary user device 106 must be located in a secured location, such as the premises of the enterprise that operates the computing environment 103, in order for the primary user device 106 to be authorized to render content in the primary user device 106. In another example, a compliance rule 119 can specify that a lock screen is required to be generated when the primary user device 106 or the secondary user device 109 is "awoken" from a low power "sleep" state and that a passcode is required for a user to unlock the lock screen. Some compliance rules 119 can be based on time, geographical location, or network properties. For instance, the primary user device 106 or the secondary user device 109 can satisfy a compliance rule 119 when the primary user device 106 or secondary user device 109 is located within a particular geographic location.

The primary user device 106 or the secondary user device 109 can satisfy a compliance rule 119 other examples when the primary user device 106 or the secondary user device 109 is in communication with a particular network, such as a particular local area network that is managed by the computing environment 103. Furthermore, a compliance rule 119 in another example can be satisfied upon the time and date matching specified values.

Another example of a compliance rule 119 involves whether a user belongs to a particular user group. For instance, a compliance rule 119 can include a whitelist or a blacklist that specifies whether particular users or groups of users are authorized to perform various functionality.

In some examples, an enterprise can operate the management service 116 to ensure that the client devices of its users, such as the primary user device 106 and the secondary user device 109, satisfy respective compliance rules 119. By ensuring that the client devices of its users are operating in compliance with the compliance rules 119, the enterprise can control access to resources to thereby improve the security of data and devices associated with the enterprise.

The computing environment 103 can also include an enterprise data store 123. The enterprise data store 123 can be representative of multiple enterprise data stores 123 accessible by components in the computing environment 103. The enterprise data store 123 can store various data associated with the computing environment 103. For example, the enterprise data store 123 can store the compliance rules 119 that the management service 116 has assigned to the respective client devices, such as the primary user device 106 and the secondary user device 109.

The enterprise data store 123 can also store enterprise resources 126. An enterprise resource 126 can be a resource, such as a file, that is associated with the enterprise that operates the management service 116. For example, an enterprise resource 126 can be a word processing document, a spreadsheet, an image file, or a video file that employees of the enterprise have stored in the enterprise data store 123.

In addition, at least some of the enterprise resources 126 can be restricted resources. In this regard, authorized access to the enterprise resource 126 can be limited based on various factors. For example, the management service 116 may authorize only devices that satisfy corresponding compliance rules 119 to access the restricted content. Examples of approaches for determining whether an enterprise resource 126 includes restricted content are provided below.

The primary user device 106 shown in FIG. 1 can be a client device that is representative of multiple primary user devices 106 that can be coupled to the network 113. The primary user device 106 can include a processor-based computer system, such as a desktop computer, a laptop computer, a personal digital assistant, a mobile phone, or a tablet computer. The primary user device 106 can include output devices, such as a primary display 129 and primary input device 133. The primary display 129 can render various content for display to a user of the primary user device 106. Examples of the primary display 129 include a liquid crystal display (LCD) and a light emitting diode (LED) display.

The primary input device 133 can facilitate the user interacting with and controlling the primary user device 106. The primary input device 133 can be coupled directly to the primary user device 106 using wired or wireless communication channels. Examples of the primary input device 133 include a keyboard, mouse, and touch pad. In some examples, the primary input device 133 can be integrated with the primary input device 133. For instance, the primary display 129 and primary input device 133 can be embodied in the form of a touch screen, which can display content and also receive input from the user.

The primary user device 106 can also include a primary managed application 136 and a primary management component 139. The primary managed application 136 can include a set of computer programs that can perform various functionality. For example, the primary managed application 136 can be a word processing application, a video and image rendering application, or an email client. The primary managed application 136 can be referred to as a managed application because the management service 116 can monitor and control at least a portion of the operation of the primary managed application 136. To this end, security libraries can be incorporated into the primary managed application 136 in various ways, at least in part by commands transmitted to the primary user device 106 by the management service 116.

In one approach of incorporating security libraries into the primary managed application 136, the management service 116 can provide a software development kit (SDK) to the developer of the primary managed application 136. Using the SDK, the developer can insert security libraries that are provided by the SDK into the primary managed application 136.

In another approach, the management service 116 or the developer of the primary managed application 136 can incorporate libraries into the primary managed application 136 through a process known as "wrapping." To wrap an application, the developer or management service 116 can decompile the application and then insert the libraries into the decompiled application. The developer or management service 116 can then recompile the application with the added security libraries.

When a library is incorporated into an application, the functionality provided by the library can be invoked by the primary managed application 136 when executed in the primary user device 106. For example, if a security library provides functionality involving the ability to monitor activity being performed by the primary managed application 136, the application can call functions provided by the library to implement the activity monitoring at least in part by commands transmitted to the primary user device 106 by the management service 116.

The primary management component 139 can monitor activity and settings in the primary user device 106 and determine whether the primary user device 106 complies with the compliance rules 119 assigned to the primary user device 106. In some examples, the primary management component 139 can parse a data object that describes the state of and settings in the primary user device 106 to determine whether the primary user device 106 is compliant. In other examples, the primary management component 139 can communicate with the management service 116 to determine whether the management service 116 deems the primary user device 106 compliant with compliance rules 119. In addition, the primary management component 139 can control at least a portion of the operation of the primary managed application 136. Although the primary management component 139 is shown separate from the primary managed application 136 in FIG. 1, the primary management component 139 can be a component of the primary managed application 136 in some examples.

The secondary user device 109 shown in FIG. 1 can be a client device that is representative of multiple secondary user devices 109 that can be coupled to the network 113. The secondary user device 109 can include a processor-based computer system. In some examples, the secondary user device 109 can be a wearable computing device, such as an optical head-mounted display device or a watch.

The secondary user device 109 can include output devices, such as a secondary display 143 and secondary input device 146. The secondary display 143 can render various content for display to a user of the secondary user device 109. Examples of the secondary display 143 include a liquid crystal display (LCD) and a light emitting diode (LED) display. In some examples, the secondary display 143 can be an optical head-mounted display that can include a projector that can project renderings of content onto a lens for viewing by the user.

The secondary input device 146 can facilitate the user interacting with and controlling the secondary user device 109. The secondary input device 146 can be coupled directly to the secondary user device 109 using wired or wireless communication channels. Examples of the secondary input device 146 include a touch pad, a panel of buttons, and a voice command system.

The secondary user device 109 can also include a secondary managed application 149 and a secondary management component 153. The secondary managed application 149 can include a set of computer programs that can perform various functionality. For example, the secondary managed application 149 can be a word processing application, a video and image rendering application, or an email client. The secondary managed application 149 can be referred to as a managed application because the management service 116 can monitor and control at least a portion of the operation of the secondary managed application 149. This end, security libraries can be incorporated into the secondary managed application 149 using, for example, one or more of the approaches described above.

In some examples, the secondary managed application 149 can include less functionality than the primary management application 136. For example, in some examples, the primary managed application 136 can be capable of rendering and editing enterprise resources 126, while the secondary managed application 149 can be capable of rendering enterprise resources 126 but not editing the enterprise resources 126. Additionally, in some examples, the secondary managed application 149 can be capable of only receiving and rendering data that is provided by the primary managed application 136.

The secondary management component 153 can monitor activity and settings in the secondary user device 109 and determine whether the secondary user device 109 complies with the compliance rules 119 assigned to the secondary user device 109. In some examples, the secondary management component 153 can parse a data object that describes the state of and settings in the secondary user device 109 to determine whether the secondary user device 109 is compliant. In other examples, the secondary management component 153 can communicate with the management service 116 to determine whether the management service 116 deems the secondary user device 109 compliant with compliance rules 119. In addition, the secondary management component 153 can control at least a portion of the operation of the secondary managed application 149. Although the secondary management component 153 is shown separate from the secondary managed application 149 in FIG. 1, the secondary management component 153 can be a component of the secondary managed application 149 in various examples.

The primary user device 106 and secondary user device 109 can communicate with each other through the network 113. In addition, the primary user device 106 and the secondary user device 109 can communicate with each other directly through a secure communication channel 156. In some examples, the secure communication channel 156 can be a channel within the network 113. The secure communication channel 156 can include a wireless Ethernet connection, a BLUETOOTH connection, or a ZIGBEE connection in some examples. The secure communication channel 156 can be made secure, for example, through encryption techniques that are included in the communication protocol used by the secure communication channel 156. In addition, the primary user device 106 and secondary user device 109 can make the secure communication channel 156 secure through encryption techniques based on a communication key provided by the primary user device 106, the secondary user device 109, or the management service 116.

Next, examples of the operation of the networked environment 100 are described. To begin, individuals or the management service 116 can denote whether respective enterprise resources 126, such as word processing documents, spreadsheets, images, and videos, include restricted content. In some examples, the process of denoting whether an enterprise resource 126 includes restricted content can be performed manually by the users associated with the management service 116. For example, when an enterprise resource 126 is created and stored in the enterprise data store 123, the user who stored the enterprise resource 126 can mark the enterprise resource 126 as containing restricted content and therefore subject to restricted access. For example, metadata for the enterprise resource 126 can specify that the enterprise resource 126 includes restricted content.

In other examples, the process of denoting whether respective enterprise resources 126 include restricted content can be performed automatically by the management service 116, the primary managed application 136, or the secondary managed application 149. For example, when an enterprise resource 126 is stored in the enterprise data store 123, the management service 116 can parse the content represented in the enterprise resource 126 as well as other information associated with the enterprise resource 126 to determine whether the enterprise resource should be denoted as containing restricted content. In some examples, the management service 116 can search the enterprise resource 126 for characters, keywords, phrases, and images indicative of restricted content. Examples of keywords and phrases that can indicate restricted content include the strings of "confidential," "secret," and "social security number."

In addition, the management service 116 can determine that an enterprise resource 126 includes restricted content based on metadata, such as a file name or the identity of the user who stored the enterprise resource 126. For instance, if the metadata for an enterprise resource 126 indicates that an attorney or accountant for the enterprise that operates the management service 116 created or stored the enterprise resource, the management service 116 can automatically denote the enterprise resource 126 as including restricted content.

Next, a description of the secondary display 143 of the secondary user device 109 being used in response to the primary user device 106 failing to satisfy a compliance rule 119 is described. To begin, the primary user device 106 and the secondary user device 109 can perform pairing process so that they can communicate with each other. In some examples, such as those in which the primary user device 106 and the secondary user device 109 communicate through a BLUETOOTH connection, the primary user device 106 and the secondary user device 109 can be paired after one or both of the devices provide a pairing key.

After the primary user device 106 has been paired with the secondary user device 109. The primary user device 106 and the secondary user device 109 can establish the secure communication channel 156. In some examples, the secure communication channel 156 can be established automatically when the primary user device 106 is paired with the secondary user device 109 by using an encrypted communication channel. In some examples, the primary management component 139 of the primary user device 106 can exchange a communication key with the secondary management component 153 of the secondary user device 109 in order to establish the secure communication channel 156. The primary user device 106 and secondary user device 109 can encrypt and decrypt messages between the devices using the communication key. Other devices that can potentially intercept the messages cannot easily decrypt the messages without the communication key.

When a user operates the primary managed application 136, the primary management component 139 can detect when the user requests to render content of an enterprise resource 126 in the primary display 129. For example, when the primary managed application 136 begins to open an image that is an enterprise resource 126, the primary management component 139 can detect that the user is requesting to render the image in the primary display 129 of the primary user device 106. As another example, if the primary managed application 136 begins to open a word processing document that is an enterprise resource 126, the primary management component 139 can detect that the user is requesting to render the document in the primary display 129.

In response to detecting that the user is requesting to render content of an enterprise resource 126 in the primary display 129, the primary management component 139 can detect whether the content is restricted content. To this end, the primary management component 139 can check whether the enterprise resource 126 is marked as containing restricted content. In other examples, in response to detecting that the user is attempting to render content in the enterprise resource 126, the primary management component 139 can parse the content in the enterprise resource 126 to determine whether the enterprise resource 126 includes restricted content using one or more of the techniques described above.

If the primary management component 139 detects that the enterprise resource 126 includes restricted content, the primary management component 139 can then detect whether the primary user device 106 satisfies the compliance rules 119 that the management service 116 has assigned to the primary user device 106. To this end, the primary management component 139 can consult a data object that describes the state of and settings in the primary user device 106. In another example, the primary management component 139 can transmit the data object to the management service 116 and obtain an indication from the management service 116 of whether the primary user device 106 is compliant.

In some examples, a compliance rule 119 can specify that the primary user device 106 is prohibited from rendering restricted content in the primary display 129 unless the primary user device 106 is located in a secured location, such as a location that is controlled by the enterprise that operates the management service 116. To determine whether the primary user device 106 is located in the secured location, the primary management component 139 can parse location data from a global positioning system (GPS) represented in the data object. In other examples, the primary management component 139 can parse the data object to determine whether the primary user device 106 is coupled to a network access point that is known to be within or near the secured area.

If the primary management component 139 determines that the primary user device 106 fails to satisfy a compliance rule 119, the primary management component 139 can prevent the restricted content from being rendered in the primary display 129. To this end, the primary management component 139 can instruct the primary managed application 136 to not cause the restricted content to be rendered in the primary display 129. In another example, the primary management component 139 can instruct the operating system of the primary user device 106 to not cause the restricted content to be rendered in the primary display 129. In other examples, the primary management component 139 can instruct the operating system of the primary user device 106 to turn off the primary display 129.

In addition, in response to detecting that the primary user device 106 fails to satisfy a compliance rule 119, the primary management component 139 can begin the process of causing the content to be rendered in the secondary display 143 of the secondary user device 109 in order to prevent unauthorized individuals from being able to view the restricted content. First, the primary management component 139 can detect whether the primary user device 106 is paired with the secondary user device 109 and whether the secure communication channel 156 exists between the primary user device 106 and the secondary user device 109. If not, the primary management component 139 can attempt to pair the devices and establish the secure communication channel 156.

In addition, the primary management component 139 can detect whether the secondary managed application 149 is installed in the secondary user device 109. To this end, the primary management component 139 can request the management service 116 or the secondary user device 109 to provide an indication of whether the secondary managed application 149 is installed in the secondary user device 109. If the secondary managed application 149 is not installed, the primary management component 139 can request the secondary user device 109 to obtain and install the secondary managed application 149 from, for example, an application repository provided by the management service 116.

After the primary management component 139 has determined that the secondary managed application 149 is installed in the secondary user device 109, the primary management component 139 can also detect whether the secondary user device 109 satisfies applicable compliance rules 119. To determine whether the secondary user device 109 complies with the compliance rules 119, the primary management component 139 can request the secondary management component 153 or the management service 116 to perform a compliance analysis of the secondary user device 109 and provide the primary management component 139 with a description of the results.

In some examples, a compliance rule 119 can specify that the primary user device 106 and the secondary user device 109 must be operated by the same user. The primary management component 139 can determine whether this compliance rule 119 is satisfied by obtaining authentication data, such as a password, biometric data, or facial recognition data from the secondary user device 109 and determining whether the authentication data is authentic. In another example, the primary management component 139 can determine whether this compliance rule 119 is satisfied by determining whether the primary user device 106 and secondary user device 109 are enrolled with the management service 116 using the same user account or access credentials.

As another example, a compliance rule 119 can specify that the secondary user device 109 must be within a particular distance from the primary user device 106 in order for the secondary user device 109 to be deemed compliant. To detect whether the compliance rule 119 is satisfied, the primary management component 139 can request location data from the secondary user device 109 and compare the received location data to the location of the primary user device 106. If the location data for the secondary user device 109 indicates that the secondary user device 109 is within a particular distance from the location of the primary user device 106, the primary management component 139 can determine that the compliance rule 119 is satisfied. In another example, the primary management component 139 can measure signal strength levels for communications between the primary user device 106 and the secondary user device 109 and determine that the secondary user device 109 is within the specified range as long as the signal strength level is above a predefined level. In another example, the primary management component 139 can request the secondary user device 109 to specify the particular LAN or network access point to which the secondary user device 109 is in communication. If the primary user device 106 and the secondary user device 109 are in communication with the same LAN or network access point, the primary management component 139 can determine that the compliance rule 119 is satisfied.

If the primary management component 139 detects that the secondary user device 109 satisfies the applicable compliance rules 119, the primary management component 139 can cause the restricted content of the enterprise resource 126 to be rendered in the secondary display 143 of the secondary user device 109 in various ways. In one approach, the primary management component 139 can obtain or generate display data, such as raster image data, that represents renderings of the restricted content and then stream the display data to the secondary user device 109 for rendering in the secondary display 143. In this approach, the primary management component 139 can stream renderings of what would otherwise have been rendered in the primary display 129. Once the secondary user device 109 obtains the display data, the secondary managed application 149 can cause the display data to be rendered in the secondary display 143.

Another approach of causing the restricted content to be displayed in the secondary display 143 of the secondary user device 109 involves causing the secondary user device 109 to obtain at least a portion of the corresponding enterprise resource 126. For example, the primary management component 139 can provide a message to the secondary user device 109 that commands the secondary management component 153 to retrieve the enterprise resource 126 containing the restricted content. In another example, the primary management component 139 can request the management service 116 to push the enterprise resource 126 containing the restricted content to the secondary user device 109. Once the secondary user device 109 has obtained the enterprise resource 126, the primary managed application 136 can instruct the secondary managed application 149 to open the enterprise resource 126 and render the restricted content in the secondary display 143 of the secondary user device 109.

When the restricted content is being rendered in the secondary display 143 of the secondary user device 109, the primary user device 106 and secondary user device 109 can communicate so that the user can operate both the primary input device 133 of the primary user device 106 and the secondary input device 146 of the secondary user device 109 to interact with the rendering of the restricted content. For examples in which the primary management component 139 streams data representing the rendered content to the secondary user device 109 for display in the secondary display 143, the secondary management component 153 can forward inputs made using the secondary input device 146 to the primary management component 139 so that the primary managed application 136 can respond to the forwarded inputs. For examples in which the secondary user device 109 obtains the enterprise resource 126 to render the restricted content, the primary management component 139 can forward inputs made using the primary input device 133 to the secondary management component 153 so that the secondary managed application 149 can respond to the forwarded inputs. In this way, both the primary input device 133 and the secondary input device 146 can be used to manipulate and interact with the rendering of the restricted content in the secondary display 143.

When the secondary user device 109 renders the restricted content in the secondary display 143, the primary management component 139 and the secondary management component 153 can continue to detect whether the primary user device 106 and the secondary user device 109 comply with the respective compliance rules 119. For example, the primary management component 139 can detect whether the primary user device 106 is compliant using one or more of the techniques discussed above. In addition, the primary management component 139 can request the management service 116 or the secondary management component 153 to provide information indicating whether the secondary user device 109 is compliant with applicable compliance rules 119.

If the primary management component 139 determines that either device fails to comply with a compliance rule 119, the primary management component 139 can stop the restricted content from being rendered in the secondary display 143. To this end, the primary management component 139 can stop transmitting the content to be rendered to the secondary user device 109, or the primary management component 139 can instruct the secondary management component 153 to stop rendering the content.

Similarly, the secondary management component 153 can detect whether the secondary user device 109 is compliant using one or more of the techniques described above. In addition, the secondary management component 153 can request the management service 116 or the primary management component 139 to provide information indicating whether the primary user device 106 is complaint with applicable compliance rules 119. If the secondary management component 153 determines that either device is non-complaint, the secondary management component 153 can stop the restricted content from being rendered in the secondary display 143. To this end, the secondary management component 153 can instruct the secondary managed application 149 to stop rendering the restricted content.

In addition, if the primary user device 106 or the secondary user device 109 fails to satisfy a compliance rule 119, the primary management component 139 or the secondary management component 153 can initiate a remedial action. Examples of remedial actions include generating a warning message to display to the user and notifying the management service 116 of the non-compliance. In addition, the primary management component 139 or the secondary management component 153 can modify settings in the primary user device 106 or the secondary user device 109, respectively, in order to cause the primary user device 106 or secondary user device 109 to become compliant. Furthermore, in response to a non-compliance, the primary management component 139 or the secondary management component 153 can cause various features in the primary user device 106 or the secondary user device 109 to become disabled. For instance, the primary management component 139 can disable a network interface in response to the primary user device 106 failing to satisfy a compliance rule 119.

Figure 2A:
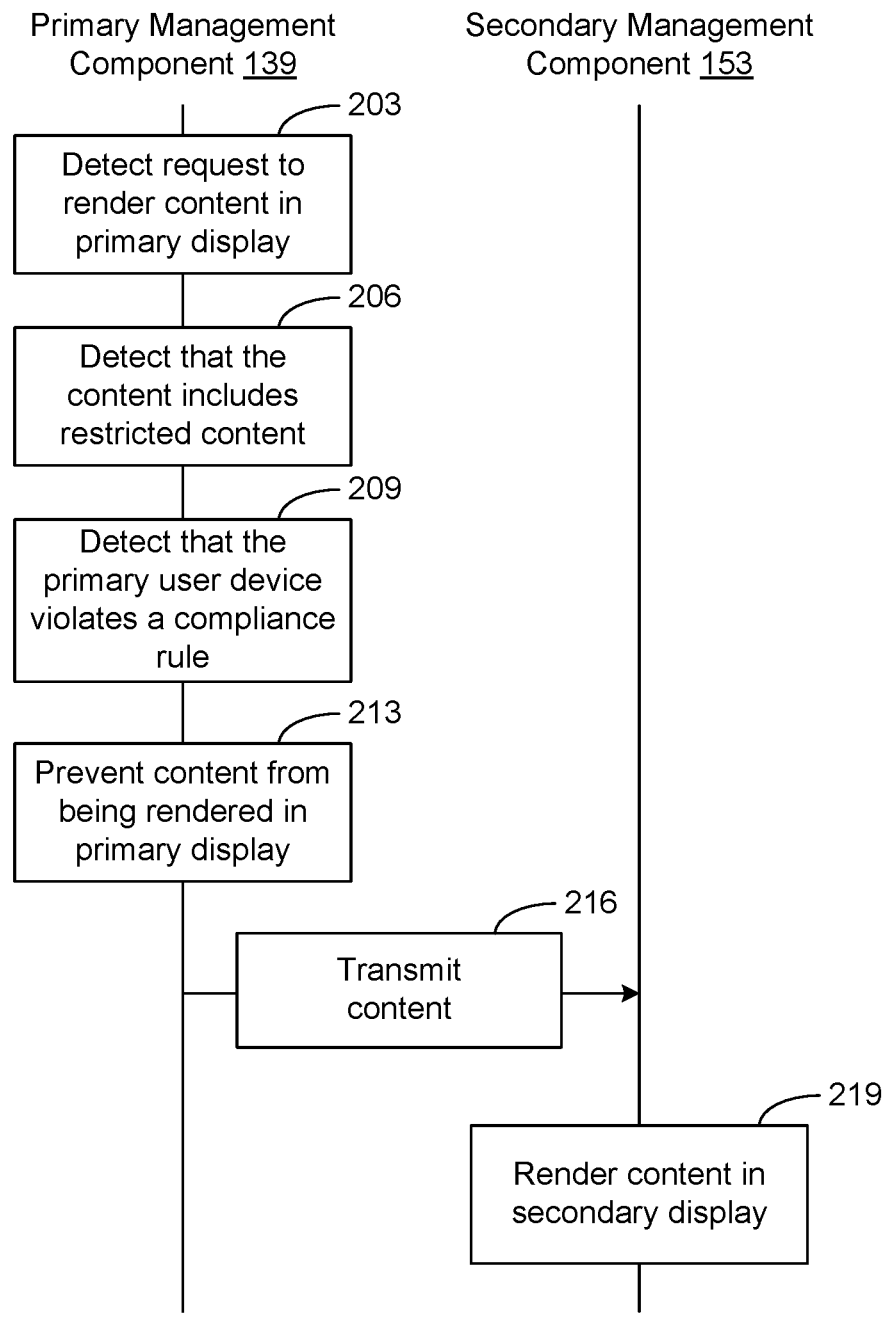
FIGS. 2A-2B are sequence diagrams illustrating examples of component interaction.

With reference to FIG. 2A, shown is a sequence diagram illustrating an example of interactions of components in the networked environment 100. The sequence diagram of FIG. 2A illustrates an example of the primary management component 139 causing restricted content to be rendered in the secondary display 143 of the secondary user device 109 by transmitting the restricted content to the secondary management component 153.

Beginning with step 203, the primary management component 139 can detect a request to render content in the primary display 129 of the primary user device 106. For example, the primary management component 139 can detect that the primary managed application 136 has requested to open an enterprise resource 126 that includes text, an image, or video.

At step 206, the primary management component 139 can detect that the content requested to be rendered includes restricted content. To this end, the primary management component 139 can determine that the corresponding enterprise resource 126 has been flagged as containing restricted content. As discussed above, an individual can flag the enterprise resource 126 as containing restricted content, or the management service 116 or the primary management component 139 can parse the content in the enterprise resource 126 to determine that the enterprise resource 126 contains restricted content.

The primary management component 139 can then move to step 209 and detect that the primary user device 106 violates a compliance rule 119. For example, a compliance rule 119 can specify that the primary user device 106 is not permitted to request to render restricted content in the primary display 129 if the primary user device 106 is located outside of a secure area, such as the premises of the enterprise that operates the management service 116.

In response to detecting the violation of the compliance rule 119, the primary management component 139 can prevent the restricted content from being rendered in the primary display 129 of the primary user device 106, as shown at step 213. To this end, the primary management component 139 can instruct the primary managed application 136 to not render the restricted content. In addition, the primary management component 139 can turn off the primary display 129 of the primary user device 106.

In addition, as shown at step 216, the primary management component 139 can transmit the content requested to be rendered to the secondary management component 153 of the secondary user device 109. In one example, the primary management component 139 can transmit at least a portion of the enterprise resource 126 that contains the content and then request the secondary management component 153 to cause the content to be rendered in the secondary display 143 of the secondary user device 109. In an alternative example, the primary management component 139 can transmit display data, such as raster image data, that the primary display 129 would otherwise display if the primary management component 139 did not prevent the primary display 129 from rendering the restricted content.

As shown at step 219, the secondary management component 153 can render the transmitted content in the secondary display 143 of the secondary user device 109. For examples in which the primary management component 139 transmitted at least a portion of the enterprise resource 126 at step 216, the secondary management component 153 can instruct the secondary managed application 149 to open the received enterprise resource 126 and render the content in the secondary display 143. For examples in which the secondary management component 153 transmitted display data at step 216, the secondary management component 153 can instruct the secondary managed application 149 to render the received display data. Thereafter, the process can end.

Figure 2B:
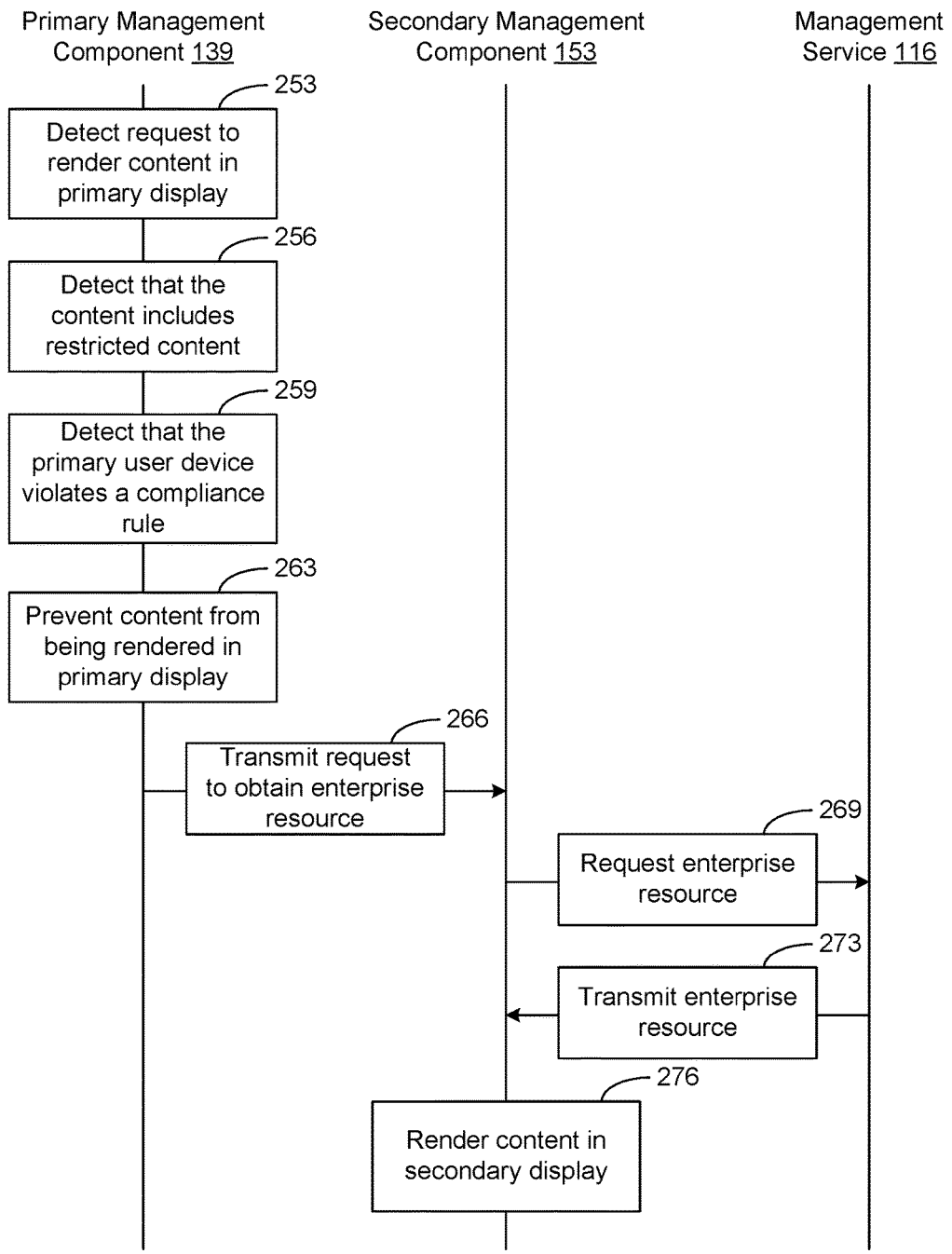

With reference to FIG. 2B, shown is a sequence diagram illustrating another example of interactions of components in the networked environment 100. The sequence diagram of FIG. 2B illustrates an example of the primary management component 139 causing restricted content to be rendered in the secondary display 143 of the secondary user device 109 by requesting the secondary management component 153 to obtain the restricted content from the management service 116.

Beginning with step 253, the primary management component 139 can detect a request to render content in the primary display 129 of the primary user device 106. For example, the primary management component 139 can detect that the primary managed application 136 has requested to open an enterprise resource 126 that includes text, an image, or video.

At step 256, the primary management component 139 can detect that the content requested to be rendered includes restricted content. To this end, the primary management component 139 can determine that the corresponding enterprise resource 126 has been flagged as containing restricted content. As discussed above, an individual can flag the enterprise resource 126 as containing restricted content, or the management service 116 or the primary management component 139 can parse the content in the enterprise resource 126 to determine that the enterprise resource 126 contains restricted content.

The primary management component 139 can then move to step 259 and detect that the primary user device 106 violates a compliance rule 119. For example, a compliance rule 119 can specify that the primary user device 106 is not permitted to render restricted content in the primary display 129 if the primary user device 106 is located outside of a secure area, such as the premises of the enterprise that operates the management service 116.

In response to detecting the violation of the compliance rule 119, the primary management component 139 can prevent the restricted content from being rendered in the primary display 129 of the primary user device 106, as shown at step 263. To this end, the primary management component 139 can instruct the primary managed application 136 to not render the restricted content. In addition, the primary management component 139 can turn off the primary display 129 of the primary user device 106.

In addition, as shown at step 266, the primary management component 139 can transmit a request for the secondary management component 153 to obtain the enterprise resource 126 that contains the restricted content. The request can include the name and storage location of the enterprise resource 126. At step 269, the secondary management component 153 can transmit a request for the management service 116 to provide the enterprise resource 126 to the secondary management component 153. The request can include the name and storage location of the enterprise resource 126.

As shown at step 273, the management service 116 can then transmit the requested enterprise resource 126 to the secondary management component 153. Then, as shown at step 276, the secondary management component 153 can render the restricted content in the enterprise resource 126 in the secondary display 143 of the secondary user device 109. For example, the secondary management component 153 can instruct the secondary managed application 149 to open the received enterprise resource 126 and render the content in the secondary display 143. Thereafter, the process can end.

Figure 3A:
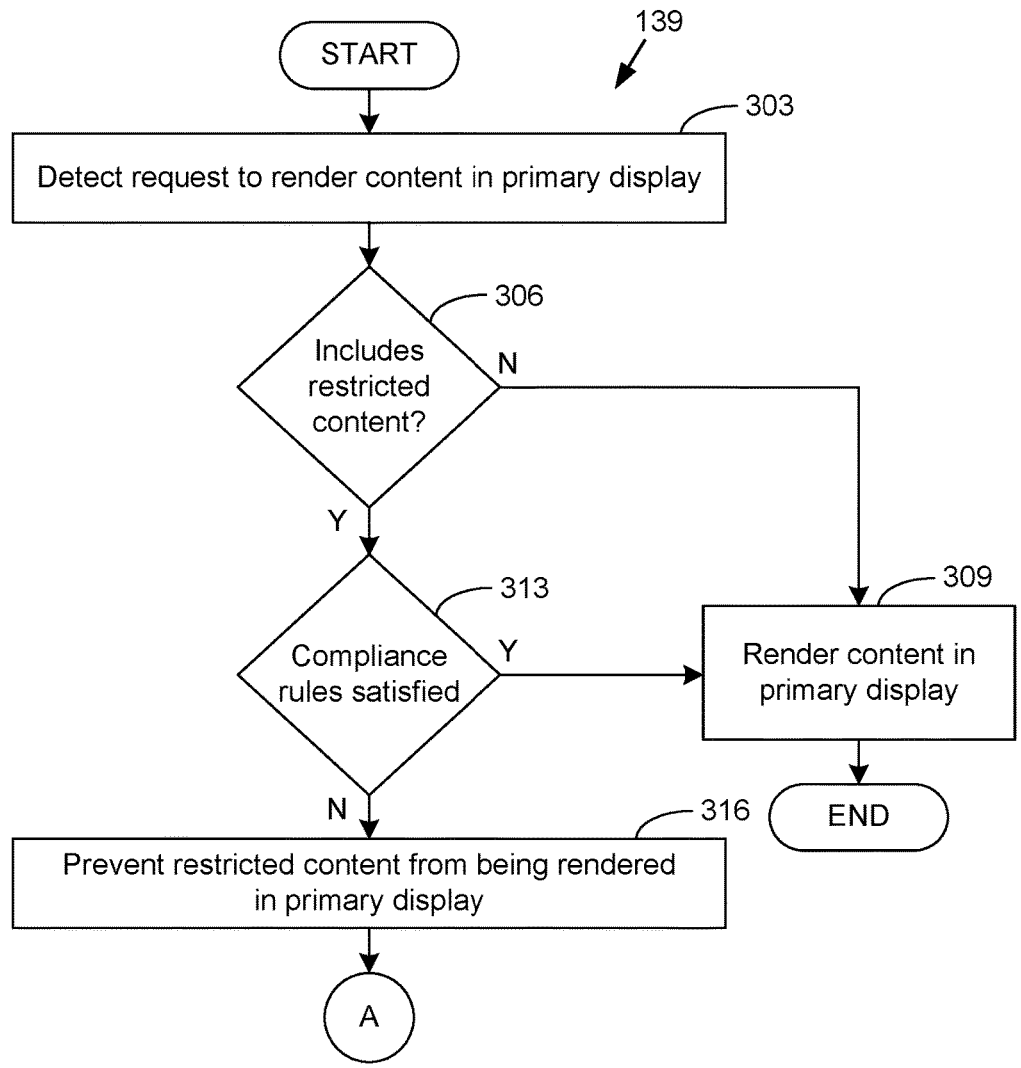
FIGS. 3A-3C are a flowchart illustrating an example of functionality implemented by a primary user device.
Figure 3B:
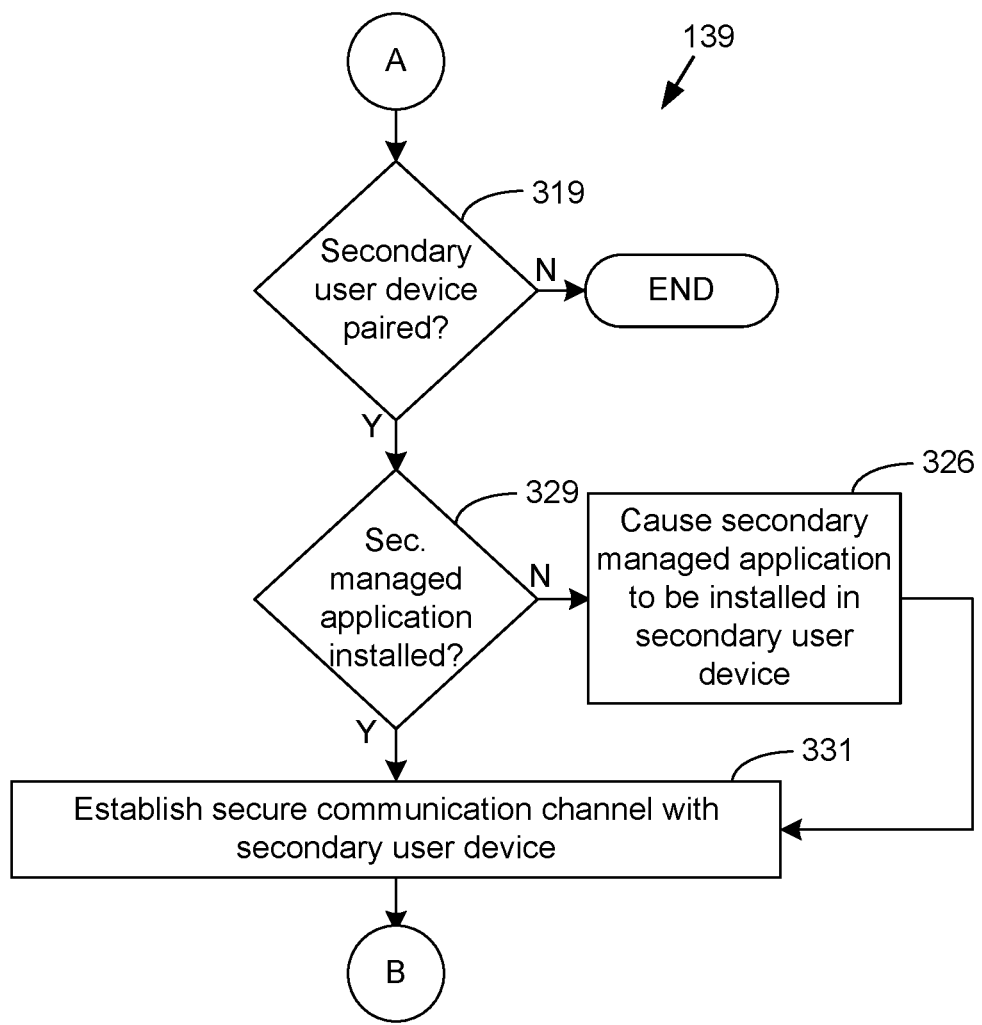
Figure 3C:
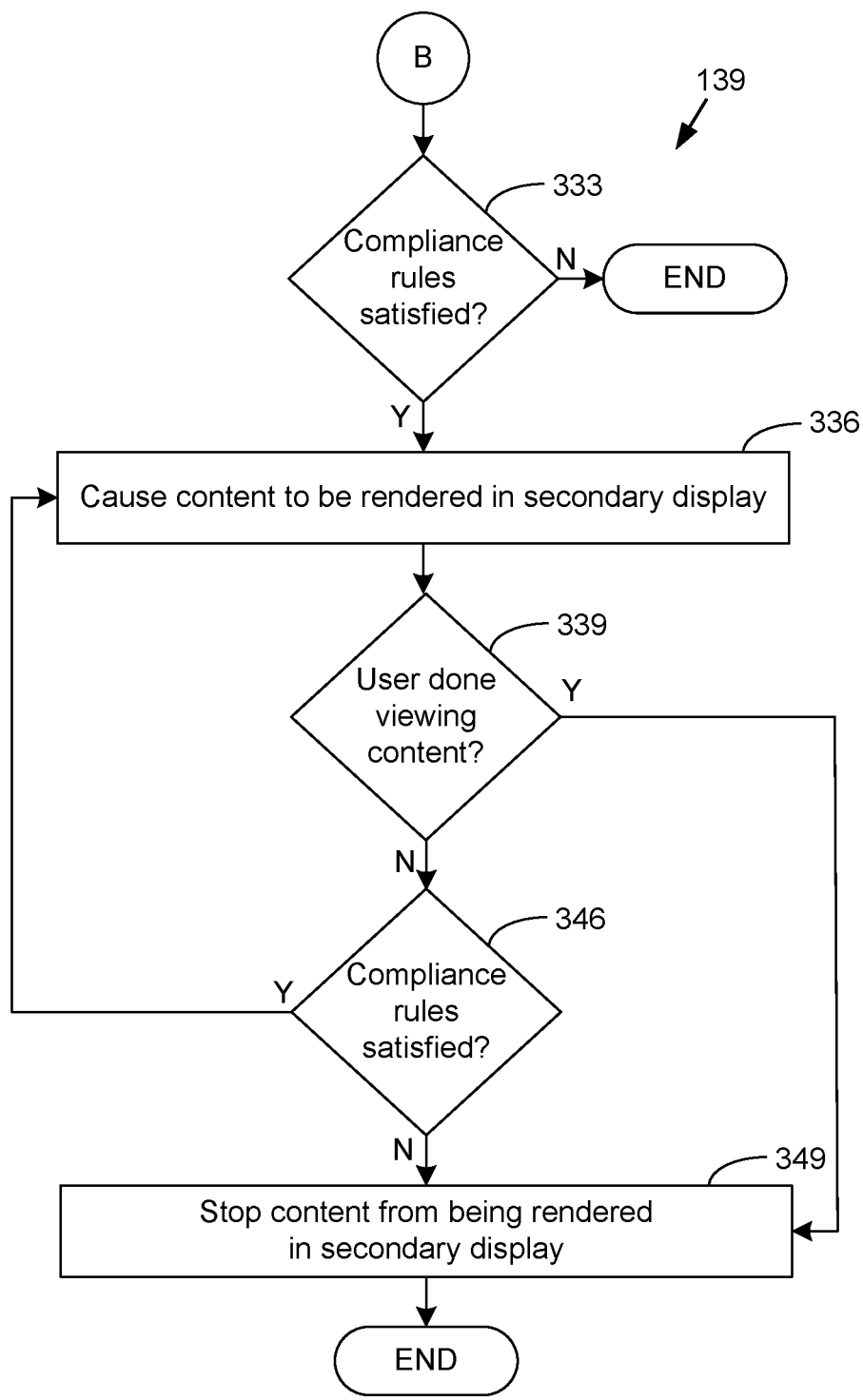

With reference to FIGS. 3A-3C, shown is a flowchart that provides an example of a portion of the operation of the primary management component 139. In particular, FIGS. 3A-3C provide an example of the primary management component 139 causing restricted content to be rendered in the secondary display 143 in response to the primary user device 106 failing to satisfy a compliance rule 119. The flowchart of FIGS. 3A-3C can be viewed as depicting an example of a method implemented in the primary user device 106.

Beginning with step 303, the primary management component 139 can detect a request to render content in the primary display 129 of the primary user device 106. For example, the primary management component 139 can detect that the primary managed application 136 has requested to open an enterprise resource 126 that contains text, an image, or video.

As shown at step 306, the primary management component 139 can detect whether the content includes restricted content. For example, as discussed above, the primary management component 139 can determine whether metadata for the enterprise resource 126 that includes the restricted content denotes that restricted content is contained in the enterprise resource 126. If the content does not include restricted content, the primary management component 139 can move to step 309 and render the content in the primary display 129 of the primary user device 106.

If the content includes restricted content, the primary management component 139 can move to step 313 and detect whether the compliance rules 119 assigned to the primary user device 106 are satisfied. If so, the primary management component 139 can move to step 309 and render the content in the primary display 129 of the primary user device 106. Otherwise, if the primary user device 106 fails to satisfy a compliance rule 119, the primary management component 139 can move to step 316 and prevent the restricted content from being rendered in the primary display 129. To this end, the primary management component 139 can, for example, instruct the primary managed application 136 to not render the content. As another example, the primary management component 139 can instruct the operating system of the primary user device 106 to turn off the primary display 129. In addition, the primary management component 139 can instruct the operating system of the primary user device 106 to lock the primary user device 106 or to present a notification to the user that the restricted content is viewable through the secondary user device 109. The primary management component 139 can then move to step 319, which is shown in FIG. 3B.

As shown at step 319, the primary management component 139 can detect whether the secondary user device 109 is paired with the primary user device 106. If the primary user device 106 and secondary user device 109 are not paired, the process can end, as shown in FIG. 3B. Otherwise, if the primary user device 106 and secondary user device 109 are paired, the primary management component 139 can move to step 329 and detect whether the secondary managed application 149 is installed in the secondary user device 109. For example, the primary management component 139 can request the management service 116 or the secondary management component 153 to provide an indication as to whether the secondary managed application 149 is installed in the secondary user device 109. If the secondary managed application 149 is not installed in the secondary user device 109, the primary management component 139 can cause the secondary managed application 149 to be installed in the secondary user device 109, as shown at step 326. To this end, the primary management component 139 can request the secondary management component 153 to retrieve and install the secondary managed application 149. In other examples, the primary management component 139 can request the management service 116 to push the secondary managed application 149 to the secondary user device 109 for installation.

If secondary managed application 149 is already installed in the secondary user device 109, or after the secondary managed application 149 has been installed, the primary management component 139 can move to step 331 and establish the secure communication channel 156 with the secondary user device 109. As discussed above, the secure communication channel 156 can be established by the primary management component 139 and secondary management component 153 exchanging a communication key that facilitates encrypting messages sent between the primary user device 106 and the secondary user device 109. The primary management component 139 can then move to step 333, which is shown on FIG. 3C.

At step 333, the primary management component 139 can detect whether the primary user device 106 and the secondary user device 109 satisfy the compliance rules 119. The primary management component 139 can parse a data object for the primary user device 106 to determine whether the primary user device 106 is compliant. In addition, the primary management component 139 can request the management service 116 or the secondary management component 153 to provide an indication of whether the secondary user device 109 is compliant. If either the primary user device 106 or the secondary user device 109 fails to satisfy the compliance rules 119, the process can end.

Otherwise, the primary management component 139 can proceed to step 336 and cause the restricted content to be rendered in the secondary display 143 of the secondary user device 109. As previously discussed, the primary management component 139 can transmit display data, such as raster image data, for display in the secondary display 143. In other examples, the primary management component 139 can request the secondary management component 153 to obtain the enterprise resource 126 and to render the restricted content that is contained in the enterprise resource 126.

At step 339, the primary management component 139 determines whether the user is done viewing the content on the secondary display 143. The primary management component 139 can determine that the user is done viewing the content, for example, by detecting that the user has closed the secondary managed application 149 or the primary managed application 136. If the primary management component 139 determines that the user is done viewing the content, the primary management component 139 can move to step 349 and stop the restricted content from being rendered in the secondary display 143.

If the primary management component 139 determines that the user is not done viewing the content on the secondary display 143, the primary management component 139 can determine whether the primary user device 106 and the secondary user device 109 still satisfy the compliance rules 119, as shown at step 346. If the compliance rules are satisfied, the primary management component 139 can return to step 336 and repeat the steps as shown.

Otherwise, if the primary user device 106 and the secondary user device 109 do not satisfy the compliance rules 119, the primary management component 139 can stop the content from being rendered in the secondary display 143 of the secondary user device 109, as shown at step 349. For example, the primary management component 139 can stop transmitting the restricted content to the secondary user device 109. In other examples, the primary management component 139 can instruct the secondary management component 153 to stop rendering the restricted content. Thereafter, the process can end.

Figure 4A:
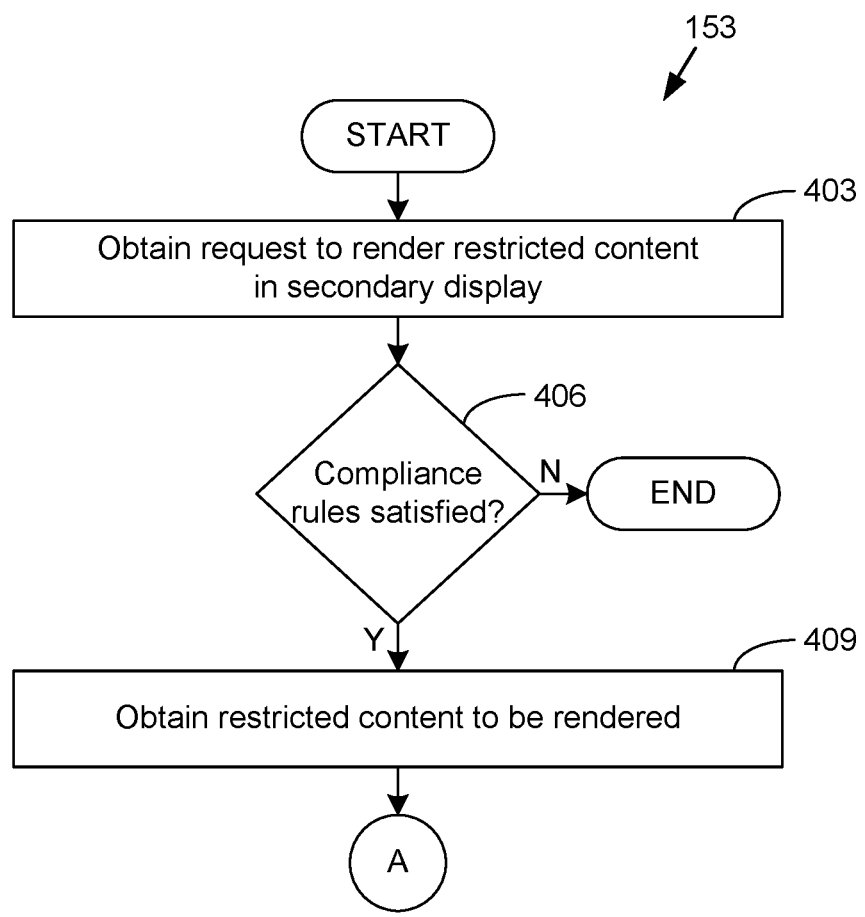
FIGS. 4A-4B are a flowchart illustrating an example of functionality implemented by a secondary user device.
Figure 4B:
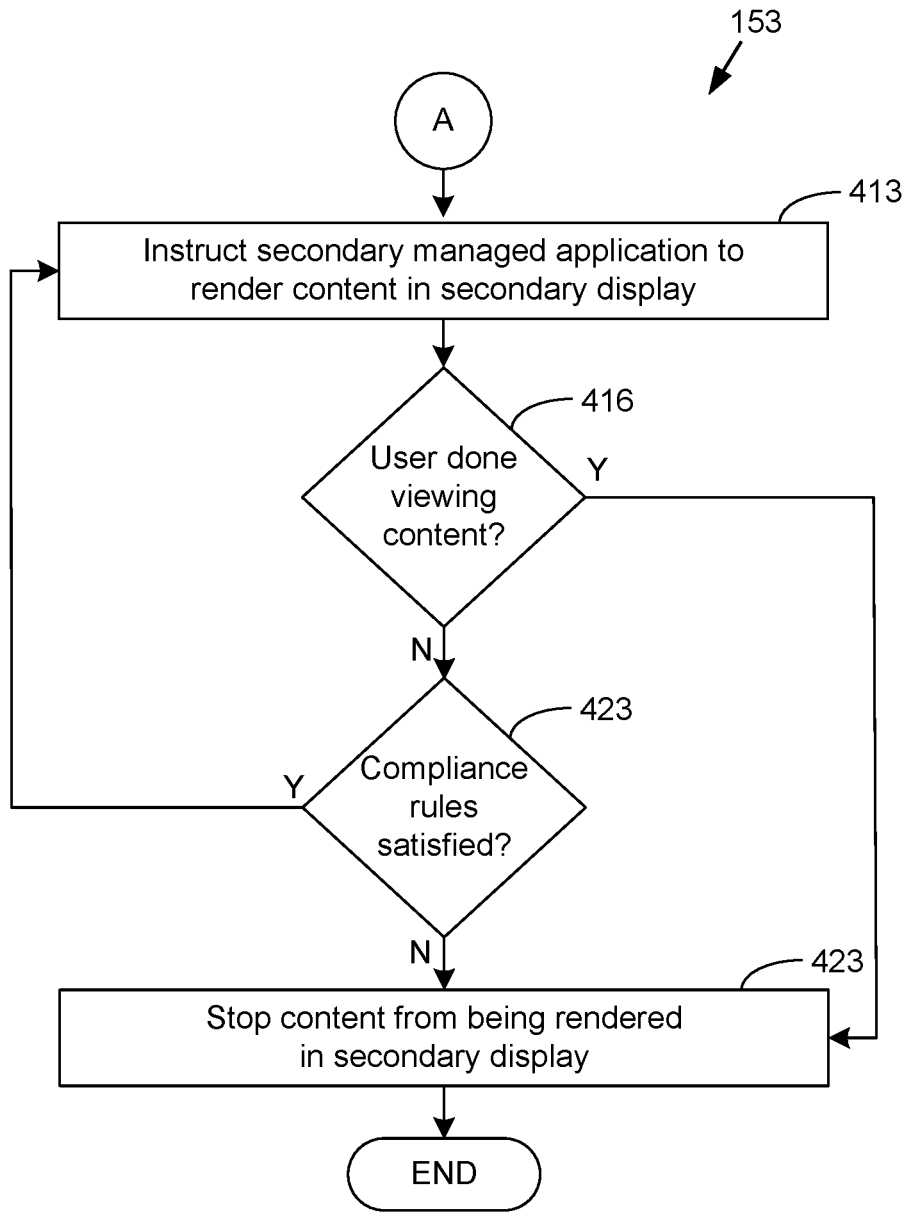

With reference to FIGS. 4A-B, shown is a flowchart that provides an example of a portion of the operation of the secondary management component 153. In particular, FIGS. 4A-4B provide an example of the secondary management component 153 rendering restricted content in the secondary display 143 in response to the primary user device 106 failing to satisfy a compliance rule 119. The flowchart of FIGS. 4A-4B can be viewed as depicting an example of a method implemented in the secondary user device 109.

Beginning with step 403, the secondary management component 153 can obtain a request to render restricted content in the secondary display 143 of the secondary user device 109. For example, the primary management component 139 can request the secondary management component 153 to render the restricted content.

At step 406, the secondary management component 153 can determine whether the secondary user device 109 satisfies various compliance rules 119. For instance, a compliance rule 119 can specify that the secondary user device 109 must be within a specified distance from the primary user device 106 in order to be approved to render restricted content. Another compliance rule 119 can specify that the same user must be operating the primary user device 106 and the secondary user device 109, as discussed above. If the secondary user device 109 does not satisfy the compliance rules 119, the process can end. In addition, the secondary management component 153 can perform a remedial action, such as notifying the user or the management service 116 of the non-compliance.

If the secondary management component 153 determines that the secondary user device 109 satisfies the compliance rules 119, the secondary management component 153 can obtain the restricted content to be rendered in the secondary display 143, as shown at step 409. In some examples, the primary management component 139 can stream the restricted content to the secondary management component 153. In other examples, the secondary management component 153 can retrieve the restricted content from the management service 116 in response to a command from the primary management component 139 to obtain the content. Furthermore, the management service 116 can push the restricted content to the secondary user device 109 in response to a request from the primary management component 139 to provide the restricted content to the secondary user device 109. In various examples, the received restricted content can be in the form of display data, such as raster image data, or contained in an enterprise resource 126. After obtaining the restricted content, the secondary management component 153 can move to step 413, which is shown in FIG. 4B.

At step 413, the secondary management component 153 can instruct the secondary managed application 149 to render the received content in the secondary display 143. Then, at step 416, the secondary management component 153 can determine whether the user is done viewing the content on the secondary display 143. The secondary management component 153 can determine that the user is done viewing the content, for example, by detecting that the user has closed the secondary managed application 149 or the primary managed application 136. If the secondary management component 153 determines that the user is done viewing the content, the secondary management component 153 can move to step 423 and stop the restricted content from being rendered in the secondary display 143.

If the secondary management component 153 determines that the user is not done viewing the content on the secondary display 143, the secondary management component 153 can determine whether the primary user device 106 and the secondary user device 109 still satisfy the compliance rules 119, as shown at step 423. If the compliance rules 119 are satisfied, the secondary management component 153 can return to step 413 and repeat the steps as shown.

Otherwise, if the primary user device 106 and the secondary user device 109 do not satisfy the compliance rules 119, the secondary management component 153 can stop the content from being rendered in the secondary display 143 of the secondary user device 109, as shown at step 423. For example, the secondary management component 153 can request the primary management component 139 to stop transmitting the restricted content to the secondary user device 109. In other examples, the secondary management component 153 can lock the secondary user device 109, turn off the secondary display 143, or close a user interface for the secondary managed application 149. Thereafter, the process can end.

The sequence diagrams and flowcharts discussed above show examples of the functionality and operation of implementations of components described herein. The components of the networked environment 100 described herein can be embodied in hardware, software, or a combination of hardware and software. If embodied in software, each step in the sequence diagrams and flowcharts can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The computing environment 103, primary user device 106, and secondary user device 109 can include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, at least portions of the management service 116, primary management component 139, and secondary management component 153 can be stored in one or more storage devices and be executable by one or more processors. Also, the enterprise data store 123 can be located in the one or more storage devices.

Components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A system, comprising:
a computing device;
a storage device storing a plurality of computer instructions executable by the computing device, wherein the plurality of computer instructions cause the computing device to at least:
   detect, by a primary management component associated with a management service, a request by a managed application whose operation is at least in part managed by the management service to render content in a first display of a primary user device, the content being at least a portion of an enterprise resource associated with the management service;
   determine whether the primary user device satisfies a compliance rule indicating whether the first display of the primary user device is authorized to render the content;
   in response to determining that the primary user device fails to satisfy the compliance rule:
      prevent the content from being rendered in the first display of the primary user device;
      transmit, by the primary management component, a request for a secondary management component to obtain the content from the management service, wherein the secondary management component responds by requesting the content from the management service;
      receive the content from the management service by the secondary management component; and
      cause, by the secondary management component, the content to be rendered in a second display of a secondary user device.

2. The system of claim 1, wherein the plurality of computer instructions further cause the computing device to at least:
   detect that the content includes restricted content; and
   determine whether the primary user device satisfies the compliance rule in response to detecting that the content includes the restricted content.

3. The system of claim 1, wherein the plurality of computer instructions further cause the computing device to at least detect whether the secondary user device is paired with the primary user device in response to determining that the primary user device fails to satisfy the compliance rule.

4. The system of claim 1, wherein the plurality of computer instructions further cause the computing device to at least:
   determine whether the secondary user device is authorized to render the content in the second display of the secondary user device; and cause the content to be rendered in the second display of the secondary user device further in response to determining that the secondary user device is authorized to render the content in the second display of the secondary user device.

5. The system of claim 1, wherein the plurality of computer instructions further cause the computing device to at least establish a secure communication channel with the secondary user device prior to causing the content to be rendered in the second display of the secondary user device.

6. The system of claim 1, wherein the plurality of computer instructions further cause the computing device to at least:
determine whether at least one of the primary user device or the secondary user device satisfies an additional compliance rule; and
stop the content from being rendered in the second display of the secondary user device in response to determining that at least one of the primary user device or the secondary user device fails to satisfy the additional compliance rule.

7. The system of claim 1, wherein the second display of the secondary user device comprises an optical head-mounted display.

8. A non-transitory computer-readable medium storing a plurality of computer instructions executable by a computing device, wherein the plurality of computer instructions cause the computing device to at least:
detect, by a primary management component associated with a management service, a request by a managed application whose operation is at least in part managed by the management service to render content in a first display of a primary user device, the content being at least a portion of an enterprise resource associated with the management service;
determining whether the primary user device satisfies a compliance rule indicating whether the first display of the primary user device is authorized to render the content;
in response to determining that the primary user device fails to satisfy the compliance rule:
prevent the content from being rendered in the first display of the primary user device;
transmit, by the primary management component, a request for a secondary management component to obtain the content from the management service, wherein the secondary management component responds by requesting the content from the management service;
receive the content from the management service by the secondary management component; and
cause, by the secondary management component, the content to be rendered in a second display of a secondary user device.

9. The non-transitory computer-readable medium of claim 8, wherein the plurality of computer instructions further cause the computing device to at least:
detect that the content includes restricted content; and
determine whether the primary user device satisfies the compliance rule in response to detecting that the content includes the restricted content.

10. The non-transitory computer-readable medium of claim 8, wherein the plurality of computer instructions further cause the computing device to at least detect whether the secondary user device is paired with the primary user device in response to determining that the primary user device fails the compliance rule.

11. The non-transitory computer-readable medium of claim 8, wherein the plurality of computer instructions further cause the computing device to at least:
determine whether the secondary user device is authorized to render the content in the second display of the secondary user device; and
cause the content to be rendered in a second display of the secondary user device further in response to determining that the secondary user device is authorized to render the content in the second display of the secondary user device.

12. The non-transitory computer-readable medium of claim 8, wherein the plurality of computer instructions further cause the computing device to at least establish a secure communication channel with the secondary user device prior to causing the content to be rendered in the second display of the secondary user device.

13. The non-transitory computer-readable medium of claim 8, wherein the plurality of computer instructions further cause the computing device to at least:
determine whether at least one of the primary user device or the secondary user device satisfies an additional compliance rule; and
stop the content from being rendered in the second display of the secondary user device in response to determining that at least one of the primary user device or the secondary user device fails to satisfy the additional compliance rule.

14. The non-transitory computer-readable medium of claim 8, wherein the second display of the secondary user device comprises an optical head-mounted display.

15. A method, comprising:
detecting, by a primary management component associated with a management service, a request by a managed application whose operation is at least in part managed by the management service to render content in a first display of a primary user device, the content being at least a portion of an enterprise resource associated with the management service;
determining whether the primary user device satisfies a compliance rule indicating whether the first display of the primary user device is authorized to render the content;
in response to determining that the primary user device fails to satisfy the compliance rule:
preventing the content from being rendered in the first display of the primary user device;
transmitting, by the primary management component, a request for a secondary management component to obtain the content from the management service, wherein the secondary management component responds by requesting the content from the management service;
receive the content from the management service by the secondary management component; and
causing, by the secondary management component, the content to be rendered in a second display of a secondary user device.

16. The method of claim 15, further comprising:
detecting that the content includes restricted content; and
determining whether the primary user device satisfies the compliance rule in response to detecting that the content includes the restricted content.

17. The method of claim 15, further comprising detecting whether the secondary user device is paired with the primary user device in response to determining that the primary user device fails to satisfy the compliance rule.

18. The method of claim 15, further comprising:
determining whether the secondary user device is authorized to render the content in a second display of the secondary user device; and
causing the content to be rendered in the second display of the secondary user device further in response to determining that the secondary user device is authorized to render the content in the second display of the secondary user device.

19. The method of claim 15, further comprising establishing a secure connection channel with the secondary user device prior to causing the content to be rendered in the second display of the secondary user device.

20. The method of claim 15, further comprising:
determining whether at least one of the primary user device or the secondary user device satisfies an additional compliance rule; and
stopping the content from being rendered in the second display of the secondary user device in response to determining that at least one of the primary user device or the secondary user device fails to satisfy the additional compliance rule.

* * * * *